(12) United States Patent
Ribeiro et al.

(10) Patent No.: US 11,596,110 B1
(45) Date of Patent: Mar. 7, 2023

(54) SPLIT FUNNEL

(71) Applicant: Just Greens, LLC, Newark, NJ (US)

(72) Inventors: Helio Marcus Ribeiro, Newark, NJ (US); Randal Reiman, Saddle Brook, NJ (US); Roger Buelow, Pepper Pike, OH (US); Shardendu K. Singh, Avenel, NJ (US)

(73) Assignee: AeroFarms, Inc., Newark, NJ (US)

( * ) Notice: Subject to any disclaimer, the term of this patent is extended or adjusted under 35 U.S.C. 154(b) by 18 days.

(21) Appl. No.: 17/193,656

(22) Filed: Mar. 5, 2021

(51) Int. Cl.
*A01G 9/029* (2018.01)
*A01G 9/00* (2018.01)

(52) U.S. Cl.
CPC ...... *A01G 9/0299* (2018.02); *A01G 2009/003* (2013.01)

(58) Field of Classification Search
CPC ...... A01G 9/0299; A01G 9/026; A01G 9/029; A01G 9/0297; A01G 9/086; A01G 9/081; A01G 9/08; A01G 2009/003; B65D 11/18; B65D 11/1846; B65D 11/186; B65D 11/1866; B65D 11/1873; B65D 11/188; B65D 11/1893; B65B 67/04; A01C 5/02
USPC ........... 47/31.1, 39, 73, 65.9, 66.3, 66.4; 220/4.21, 4.22, 4.23, 4.24; 141/337–338; 111/106
See application file for complete search history.

(56) References Cited

U.S. PATENT DOCUMENTS

| | | | | |
|---|---|---|---|---|
| 8,625 A | * | 1/1852 | Bushnell | B65B 67/04 141/390 |
| 271,507 A | * | 1/1883 | Neblett | A01C 5/02 111/106 |
| 275,505 A | * | 4/1883 | Lindsey | A01G 23/046 30/174 |
| 289,185 A | * | 11/1883 | Visscher | A01C 5/02 111/99 |
| 303,543 A | * | 8/1884 | Prentiss | A01G 13/04 206/517 |
| 437,565 A | * | 9/1890 | Byrne | A01G 9/0295 47/73 |
| 533,717 A | * | 2/1895 | Meetze | A01C 5/02 111/106 |
| 551,421 A | * | 12/1895 | Walter | A01C 5/02 111/106 |
| 601,984 A | * | 4/1898 | Reasons | A01G 9/0295 47/73 |

(Continued)

FOREIGN PATENT DOCUMENTS

| | | |
|---|---|---|
| CN | 207783535 U | 8/2018 |
| CN | 110036802 A * | 7/2019 |

(Continued)

OTHER PUBLICATIONS

U.S. Appl. No. 62/987,164, filed Mar. 9, 2020.

*Primary Examiner* — David J Parsley
*Assistant Examiner* — Morgan T Jordan
(74) *Attorney, Agent, or Firm* — McCarter & English, LLP

(57) ABSTRACT

A split funnel is provided that includes a top opening that has a first closed inner perimeter and a bottom opening distal from the top opening. The split funnel includes first and second portions that are linked by a bearing structure. The split funnel can be opened and closed along two seams which run from a top opening of the funnel to a bottom opening of the funnel. Methods of using the funnel are also provided.

15 Claims, 12 Drawing Sheets

(56) References Cited

U.S. PATENT DOCUMENTS

| | | | | |
|---|---|---|---|---|
| 797,754 A * | 8/1905 | Roth | B65B 67/04 | 53/258 |
| 1,011,170 A * | 12/1911 | Dennis | A01G 13/04 | 47/2 |
| 1,031,713 A * | 7/1912 | Hills | A01G 9/026 | 47/73 |
| 1,266,634 A * | 5/1918 | Schaefer | A01C 5/02 | 111/92 |
| 1,563,005 A * | 11/1925 | William | B67C 11/02 | 141/338 |
| 1,663,999 A * | 3/1928 | Benjamin | A01C 5/02 | 294/50.8 |
| 1,664,913 A * | 4/1928 | Bewley | A01G 9/081 | 141/73 |
| 1,776,375 A * | 9/1930 | Russell | A01G 9/02 | 47/73 |
| 2,014,311 A * | 9/1935 | Council | A01C 5/02 | 294/50.5 |
| 2,058,934 A * | 10/1936 | Yohe | A01G 9/02 | 47/79 |
| 2,219,374 A * | 10/1940 | Spurney | A01C 5/02 | 111/101 |
| 2,219,690 A * | 10/1940 | Leydecker | A01G 23/046 | 47/76 |
| 2,313,604 A * | 3/1943 | Vogel | A01G 23/046 | 66/149 R |
| 2,593,924 A * | 4/1952 | Rothkamm | A01C 5/02 | 111/101 |
| 2,600,718 A * | 6/1952 | Wilson | A01G 31/02 | 47/73 |
| 2,729,493 A * | 1/1956 | Engel | A01C 5/02 | 294/50.8 |
| 2,830,687 A * | 4/1958 | Byron | B65B 67/04 | 53/390 |
| 2,968,124 A * | 1/1961 | Coplen | A01G 9/026 | 47/72 |
| 3,471,192 A * | 10/1969 | Childs | A01G 23/046 | 47/73 |
| 3,846,936 A * | 11/1974 | Kelley | A01G 9/086 | 47/73 |
| 3,903,643 A * | 9/1975 | Blackmore | A01C 11/025 | 47/87 |
| 4,132,665 A | 1/1979 | Nelson | | |
| 4,216,622 A * | 8/1980 | Hollenbach | A01G 2/20 | 47/73 |
| 4,248,014 A * | 2/1981 | Williames | A01G 9/0295 | 47/73 |
| 4,489,969 A * | 12/1984 | Merry | A01K 80/00 | 294/50.8 |
| 4,570,423 A * | 2/1986 | DeLong | B65B 25/02 | 53/220 |
| 4,694,760 A * | 9/1987 | Camp | A01C 5/02 | 294/50.8 |
| 4,926,587 A * | 5/1990 | van Wingerden | A01G 9/086 | 47/87 |
| 5,157,869 A * | 10/1992 | Minton | A01G 9/02 | 47/75 |
| 5,241,753 A * | 9/1993 | Lalevee, Sr. | G01F 23/04 | 33/726 |
| 5,359,809 A * | 11/1994 | Johnson | A01G 23/04 | 220/4.24 |
| 5,398,444 A * | 3/1995 | Murray | A47G 33/1226 | 248/515 |
| 5,497,714 A * | 3/1996 | Schlotthauer | E21B 11/005 | 294/50.8 |
| 5,593,117 A * | 1/1997 | Alexander, III | B65F 1/1415 | 383/33 |
| 5,601,321 A * | 2/1997 | Simon | E01H 1/1206 | 294/1.4 |
| 6,119,392 A * | 9/2000 | Lais | A01G 13/04 | 47/29.2 |
| 6,138,589 A * | 10/2000 | Miller | A01C 5/02 | 111/95 |
| 6,357,172 B1* | 3/2002 | Risgaard | A01G 13/0243 | 47/32.4 |
| 6,457,238 B1 | 10/2002 | Maier et al. | | |
| 6,732,880 B1* | 5/2004 | Nash, Sr. | B65F 1/04 | 220/495.11 |
| 6,779,298 B1* | 8/2004 | Domes | A01G 5/04 | 428/34.3 |
| 6,865,845 B2* | 3/2005 | Fraleigh | A01B 49/04 | 47/75 |
| 6,904,715 B1* | 6/2005 | Lawton | A01G 9/026 | 47/66.3 |
| 6,976,334 B1* | 12/2005 | Bowditch | A01G 13/0281 | 47/29.1 |
| 7,150,238 B1* | 12/2006 | Kontorovich | A01C 5/02 | 172/378 |
| 7,819,447 B1* | 10/2010 | Ange | A01C 5/02 | 294/50.8 |
| 9,010,020 B1* | 4/2015 | Slusher | A01G 9/02 | 47/73 |
| 9,241,877 B2 | 1/2016 | Burton et al. | | |
| 10,674,678 B1* | 6/2020 | Faranso | A01G 9/026 | |
| 2004/0118328 A1* | 6/2004 | Sawatzky | A01C 11/006 | 111/106 |
| 2005/0241155 A1* | 11/2005 | Demar | A01C 5/02 | 30/174 |
| 2006/0225345 A1* | 10/2006 | Westrate | A01G 23/04 | 47/76 |
| 2006/0283852 A1* | 12/2006 | Greiner | B65F 1/06 | 220/4.22 |
| 2007/0130825 A1* | 6/2007 | Stearns | A01G 13/0281 | 47/31.1 |
| 2007/0157513 A1* | 7/2007 | Varney | A01G 9/026 | 47/71 |
| 2017/0354097 A1* | 12/2017 | Hadley | A01G 9/029 | |
| 2018/0295772 A1* | 10/2018 | Constantine | A01C 5/02 | |
| 2019/0230870 A1* | 8/2019 | Shaffer | A01G 13/0243 | |

FOREIGN PATENT DOCUMENTS

| | | | | |
|---|---|---|---|---|
| CN | 110476659 A | * | 11/2019 | A01G 27/00 |
| CN | 112273100 A | * | 1/2021 | A01G 1/125 |
| FR | 2365107 A1 | | 4/1978 | |
| FR | 2990324 A1 | * | 11/2013 | A01C 5/02 |
| GB | 2045044 A | * | 10/1980 | A01G 9/0291 |
| JP | 2013116129 A | | 6/2013 | |
| JP | 2014209871 A | * | 11/2014 | A01G 27/00 |
| JP | 2018068234 A | | 5/2018 | |
| WO | WO-8203530 A1 | * | 10/1982 | |
| WO | WO-2010054157 A2 | * | 5/2010 | A01G 1/125 |
| WO | WO/2019/058941 | | 3/2019 | |

* cited by examiner

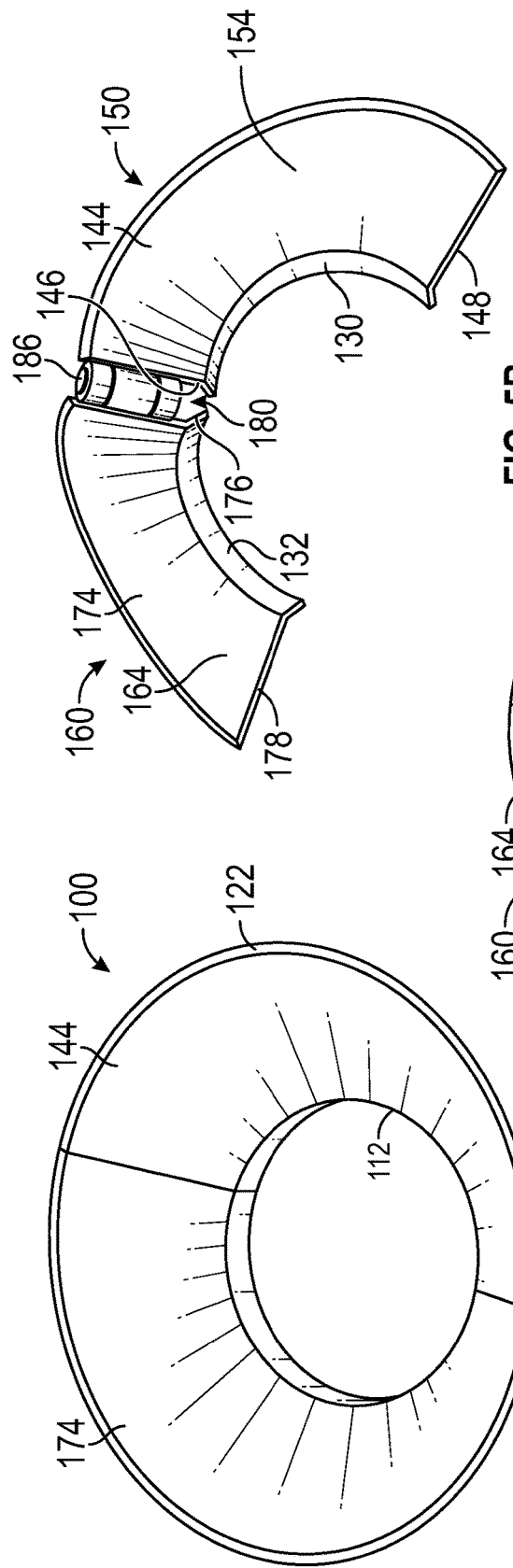
FIG. 5A
FIG. 5B
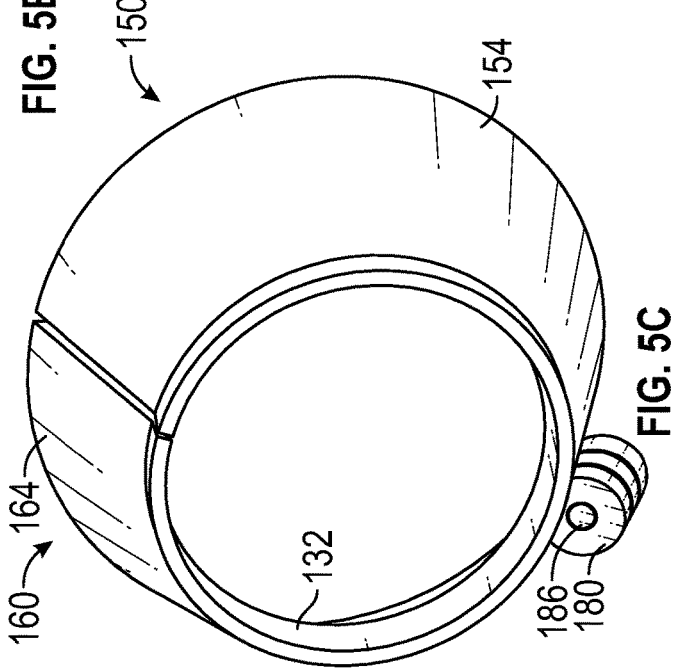
FIG. 5C

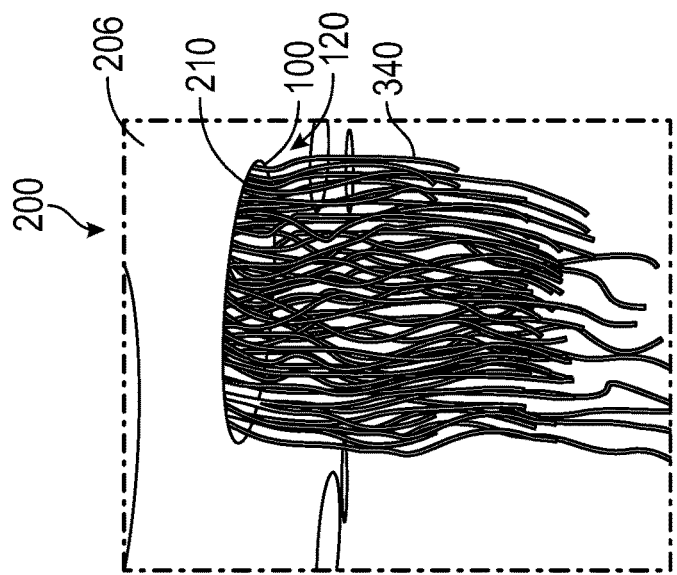
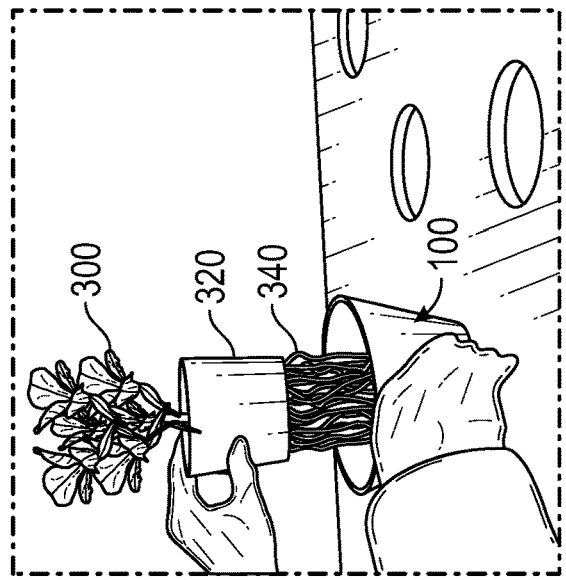
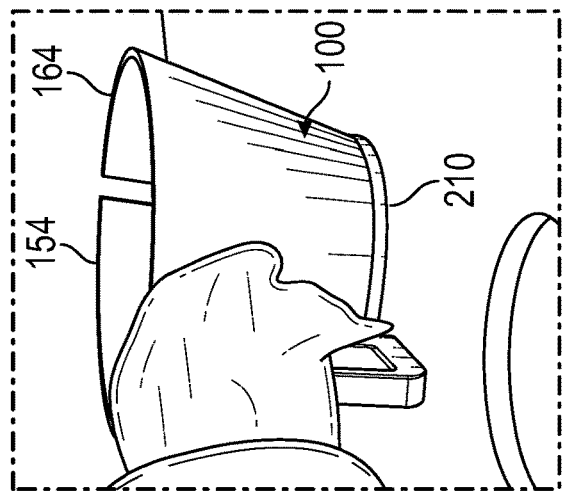
FIG. 6A
FIG. 6B
FIG. 6C

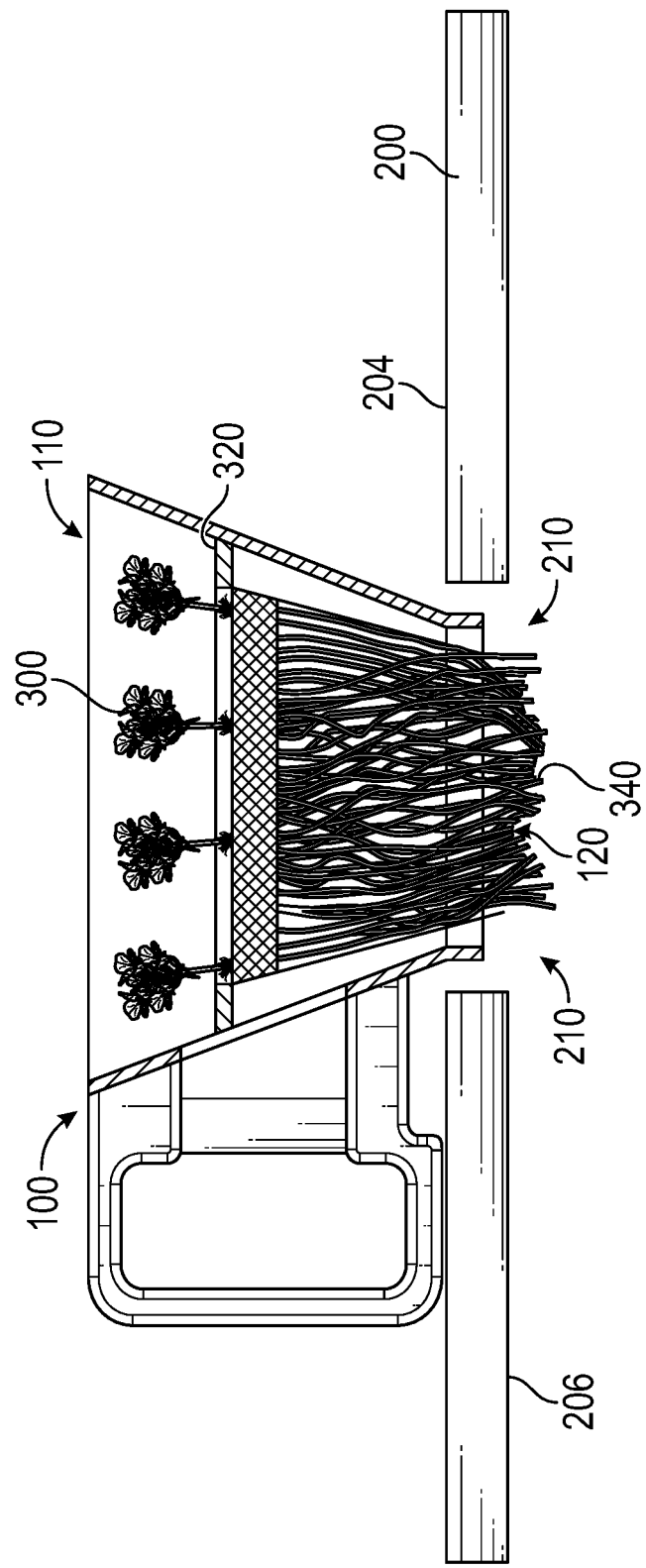

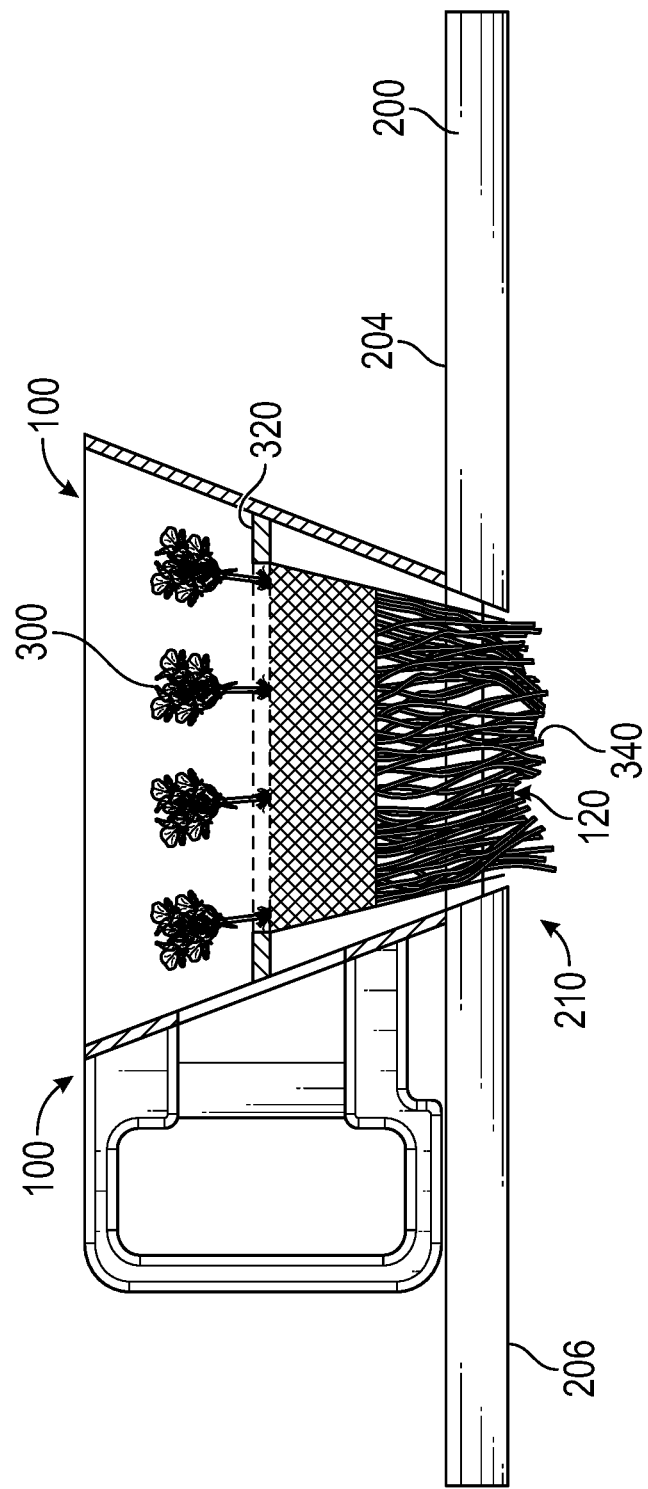

SPLIT FUNNEL

CROSS-REFERENCE TO RELATED APPLICATION

The present application claims priority benefit to a provisional patent application entitled "Split Funnel" that was filed with the U.S. Patent Office on Mar. 9, 2020, and assigned Ser. No. 62/987,164. The entire content of the foregoing provisional patent application is incorporated herein by reference.

TECHNICAL FIELD

This disclosure relates generally to a funnel that can be opened and closed along two seams that run from a top opening of the funnel to a bottom opening of the funnel. Methods of using the funnel are also disclosed.

BACKGROUND

Plants may be moved from one growth environment to a second growth environment during their growth and development. For example, increased spacing between plants as the shoot mass of the plants increases can help reduce a shade avoidance response in the plants. Increased spacing between plants as they develop can also reduce competition between their root masses for nutrient resources and water. Increased spacing as plants mature from the vegetative to the fruiting stage can also aid in subsequent harvesting. During transplantation, the delicate roots of the developing plants can be damaged which negatively affects the plants subsequent development. Protecting the roots as well as vegetation and flowers of a plant during transplantation can lead to successful growth of the plant in a new growth environment.

A continuing need exists for tools and methods to protect the roots and vegetation of developing plants when they are moved from one growth environment to a second growth environment.

DESCRIPTION

The embodiments disclosed herein meet these and other needs by providing a split funnel that can be opened and closed along two seams that can run from a top opening of the funnel to a bottom opening of the funnel. The split funnel can include a first portion and a second portion that can be linked to each other so that the split funnel can (i) be opened along its seams to separate the first and second portions from each other, and (ii) the first and second portions of the funnel can be moved toward one another to close and reform the split funnel along the seams. The first portion and the second portion of the funnel can be linked to each other by a bearing structure. The split funnel can be used to facilitate the transplantation of plants from a first growth environment into a second growth environment while protecting the roots, and optionally the shoot system, of the plants. The split funnel allows the roots and the shoots of a plant to be gently captured and guided by the split funnel and directed into a new growth environment. The first portion and second portion of the split funnel can optionally include a manipulator portion whereby the first portion and second portion of the split funnel can be moved towards or away from each other using the one or more manipulator(s) portions to join or separate the funnel portions.

BRIEF DESCRIPTION OF THE DRAWINGS

To assist those of skill in the art in making and using the apparatus, systems and methods disclosed herein, reference is made to the accompanying figures, wherein:

FIGS. 5A-C are illustrations of an embodiment of a split funnel.

FIGS. 6A-C illustrate a split funnel positioned in an opening of a grow board, a plant with roots being placed in the top opening of the split funnel, and a bottom surface of a grow board with plant roots and a bottom surface of the bottom opening of the split funnel protruding from the grow board opening.

FIG. 9 is an illustration of a split funnel that can have a bottom opening smaller than the opening in a grow board.

FIG. 10 is an illustration of a split funnel that can have a bottom opening that is the same size or larger than an opening of a grow board; the bottom of the split funnel can be in contact or slightly above the top surface of the grow board; the opening of the grow board can be tapered.

DETAILED DESCRIPTION

In embodiments of the disclosure, the term "developing plant(s)" can refer to one or more germinating seeds, one or more seedlings with or without true leaves, one or more growing plants, or any combination of these that are on a generally top surface of a growth medium. Developing plants can have a root system and a shoot system. A "growth environment" can refer to various environments where plants can be developed and can include, but are not limited to, grow boards with one or more openings for plants, pots, Styrofoam blocks and the like with openings for plants, and openings or holes in soil for plants.

Figure 1A:
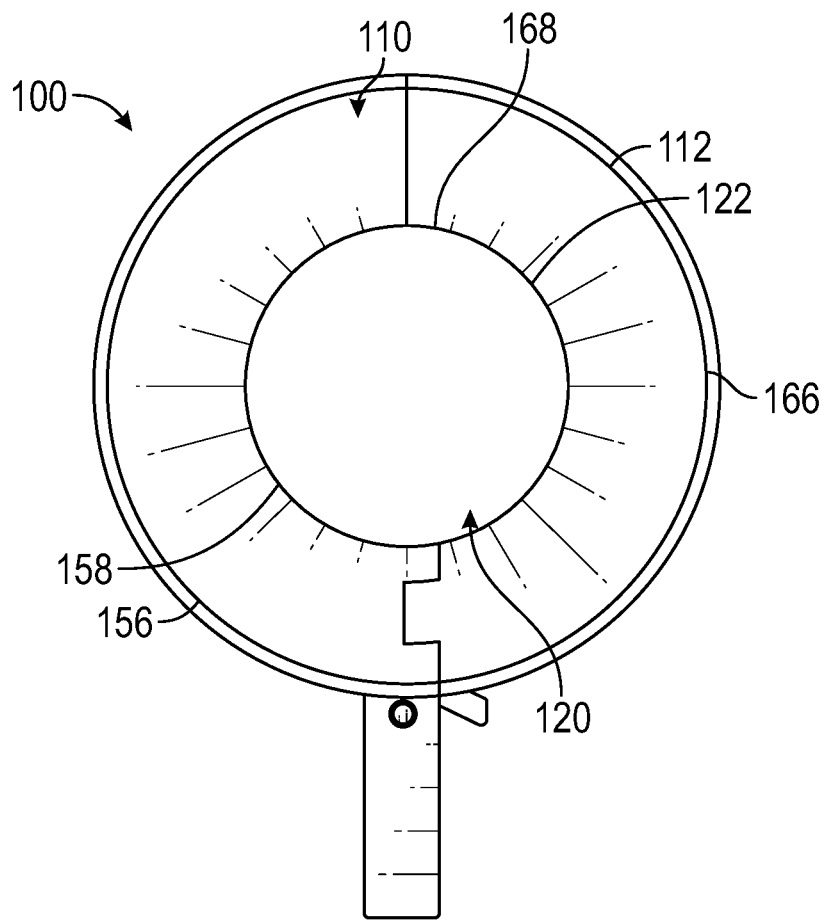
FIGS. 1A-E are illustrations of an embodiment of a split funnel.
Figure 1B:
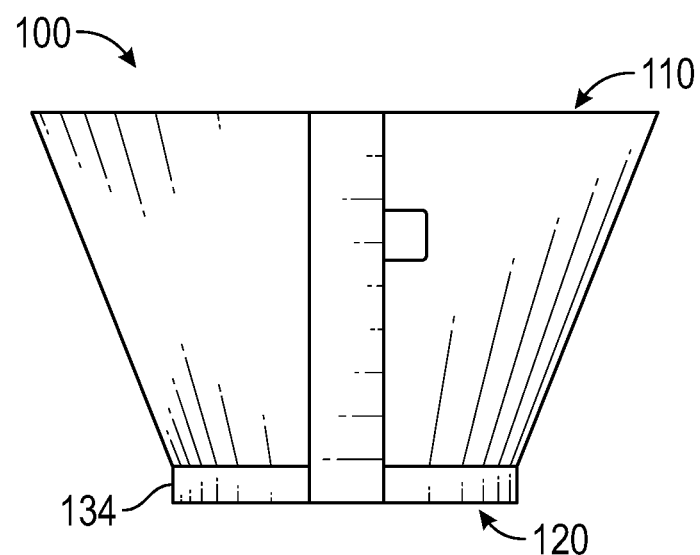
Figure 1C:
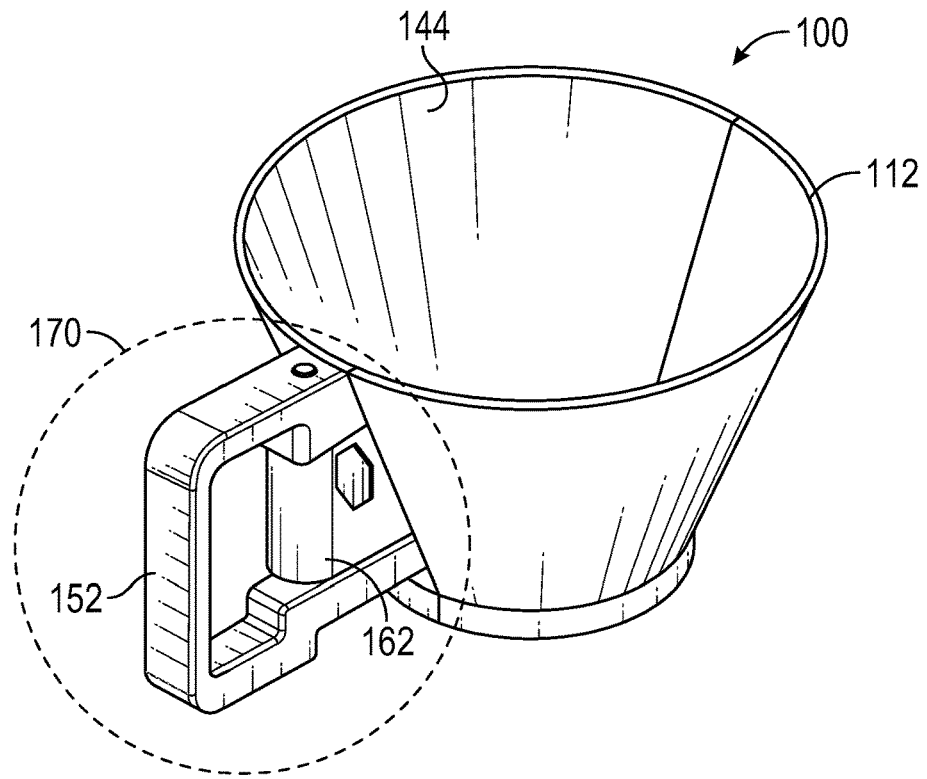
Figure 1D:
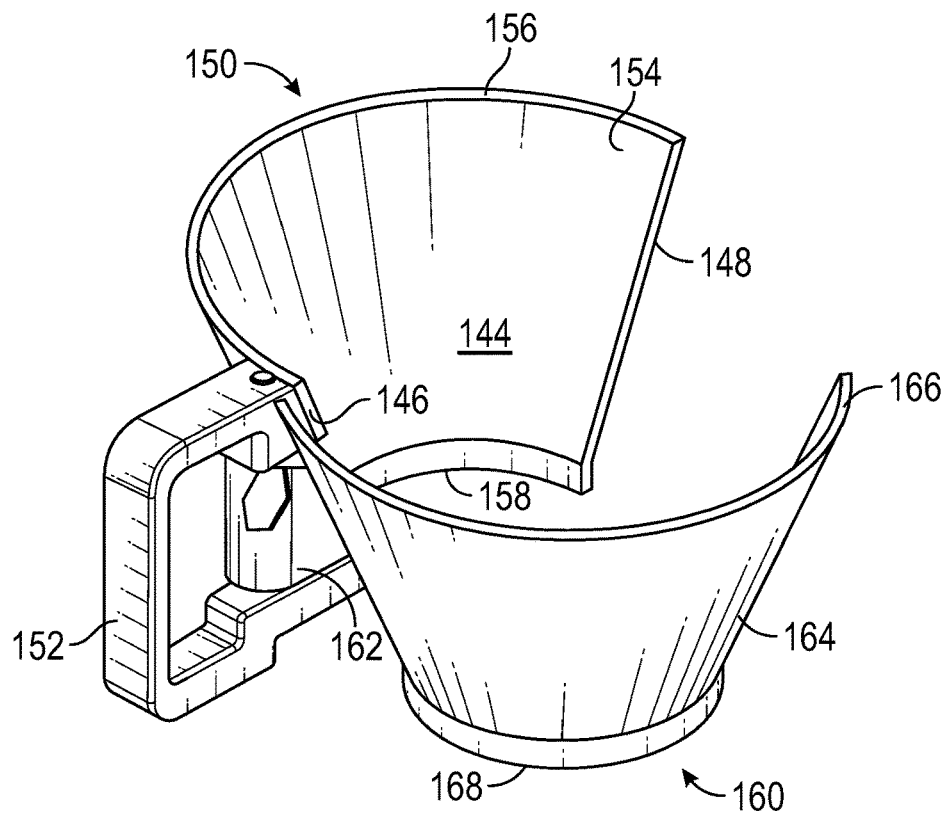
Figure 1E:
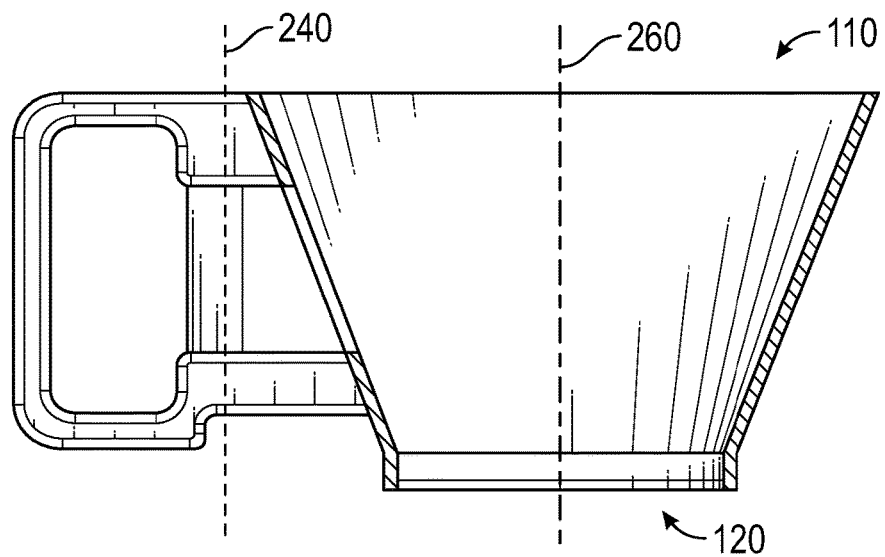

As illustrated in FIGS. 1A, 1B and 1E, the split funnel 100 can include a top opening 110 that has a first closed inner perimeter 112; the split funnel can include a bottom opening 120 distal from the top opening that has a second closed inner perimeter 122. The second closed inner perimeter 122 can be smaller than the first closed inner perimeter 112.

The top opening 110 of the split funnel can be large enough to accommodate the roots 340 of a plant(s) 300. In some embodiments the plants are those that can be grown in an indoor agricultural facility. The split funnel 100 top opening 110 in a closed position can also be large enough to accommodate an optional net pot or grow bag 320 used to support the plant(s) 300 and root system(s) 340 during development. The bottom opening 120 of the split funnel can be smaller than the top opening 110, and the funnel portions of the split funnel can slope from the larger top opening to the smaller bottom opening when the split funnel is in a closed position. The top and bottom funnel openings can be sized to support the plant(s), roots, and optional support structure 320 when the split funnel is closed as illustrated for example in FIG. 9.

Figure 4A:
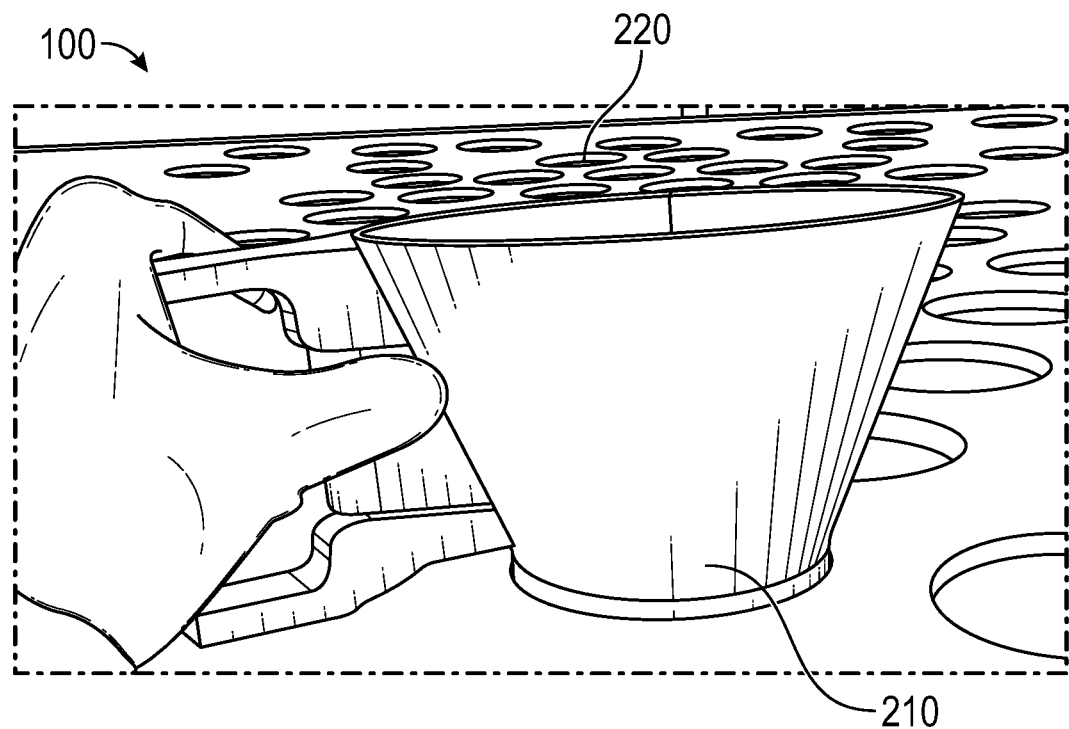
FIGS. 4A-B are illustrations of an embodiment of a split funnel in a closed position and a grow board.
Figure 4B:
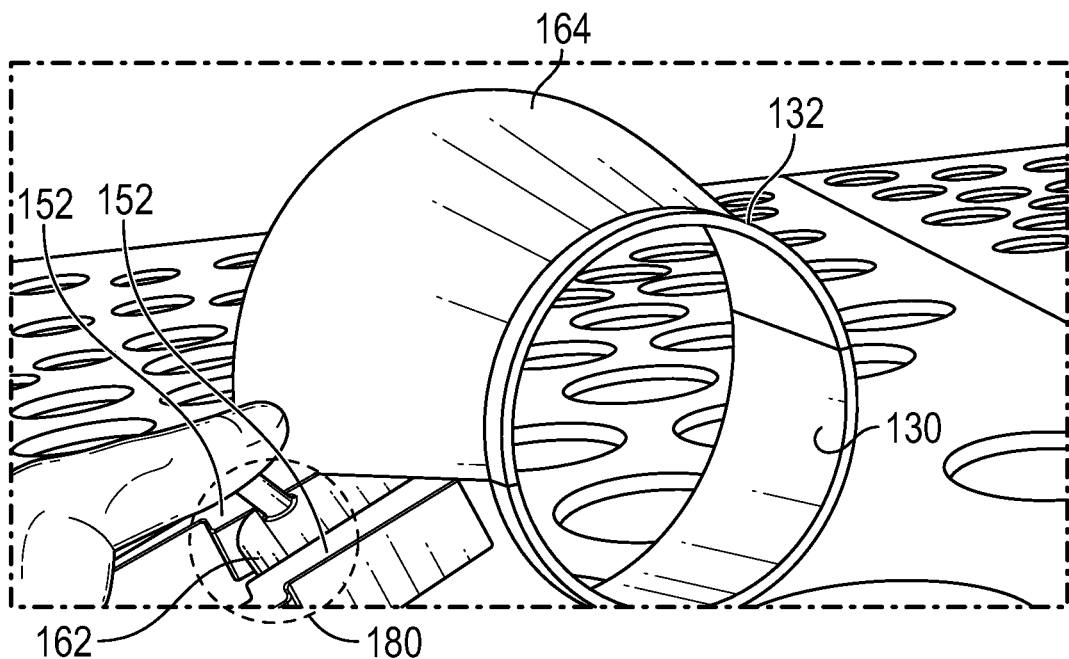
Figure 11:
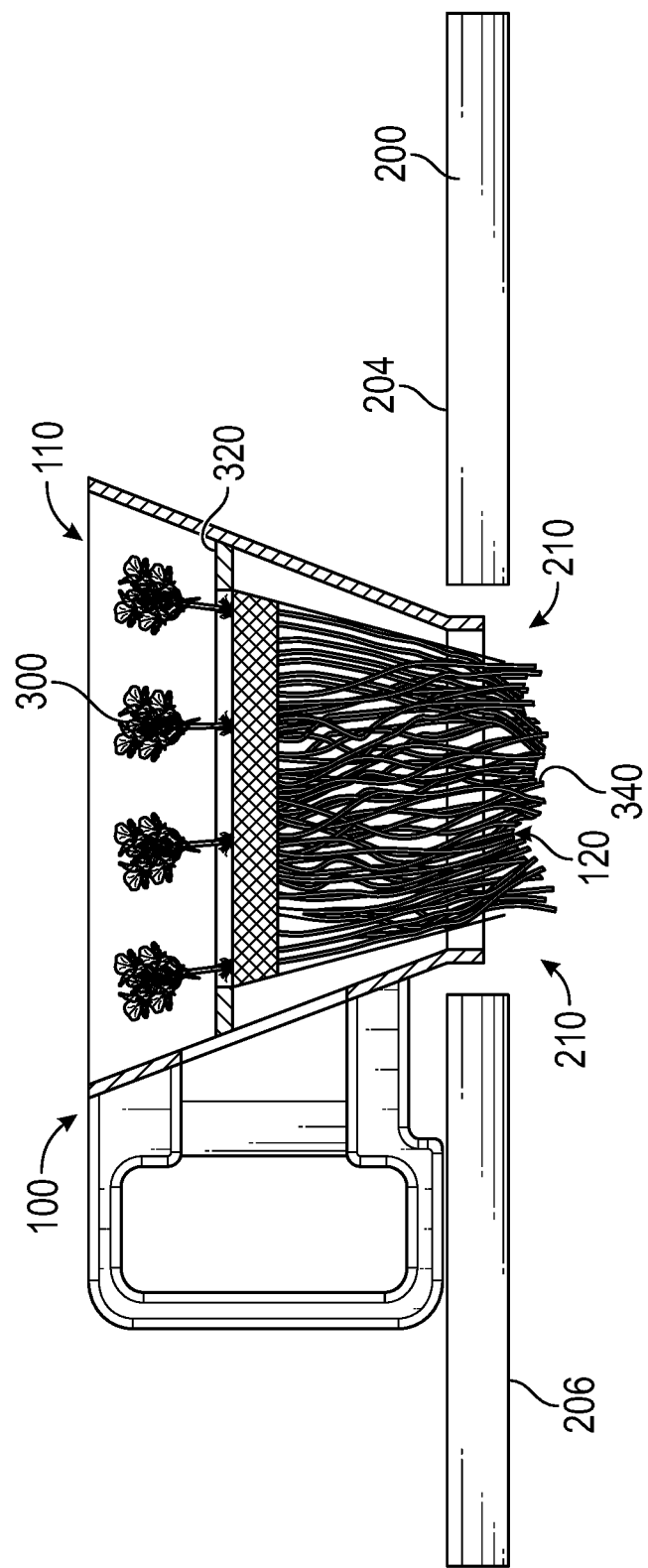
FIG. 11 is an illustration of a split funnel that can have a bottom opening smaller than the opening in a grow board and where the bottom opening can be above the top surface of the grow board.

The outside wall portion of the bottom opening 120 of the closed split funnel can be larger than the opening 210 in the top surface 204 of the new growth environment 200 as illustrated in FIG. 10. The outside wall portion of the bottom opening 120 of the closed split funnel can fit into or can be smaller than the opening 210 in the top surface 204 of the new growth environment as illustrated in FIG. 4A, FIG. 9 and FIG. 11. The opening that the plants are moved into can be tapered as illustrated in FIG. 10, or the opening that the plants are moved into can be untapered as illustrated in FIG. 9 and FIG. 11.

The lower surface of the bottom opening of the closed split funnel can be positioned below the level or top surface 204 of an opening of the new growth environment as illustrated in FIG. 9. The lower surface of the bottom opening of the closed split funnel can be positioned at or just above the level or top surface 204 of the opening of the new growth environment as illustrated in FIG. 10; in this position the split funnel can be opened and closed at or above the top surface of the grow board. The bottom opening can be positioned above the level or surface of the new growth environment as illustrated in FIG. 11 provided the roots are guided and within the opening of the new growth environment.

In use the bottom opening of the split funnel can be positioned to overlap the opening 210 of the new growth environment as illustrated in FIG. 6 and FIGS. 9-11. The plant 300 with roots can be placed into the top opening 110 of the split funnel; the split funnel can be in a closed or substantially closed position. During placement of the plant into the split funnel 100, the roots 340 can be guided into the top opening 110 of the split funnel, guided into and through the bottom opening 120 of the split funnel, and guided into the opening 210 of the new growth environment 200. The split funnel can be opened by moving the two funnel portions 154 and 164 away from each other thereby transferring the plant with roots into the opening of the new growth environment. After transferring the plant into the new growth environment, the split funnel can be moved and closed to overlap another opening in the new growth environment for subsequent transplanting.

The split funnel can be opened and closed along two seams that can run from a top opening of the funnel to the bottom opening of the funnel. The top inner perimeter edges (156, 166) of the top opening 110 and the bottom inner perimeter edges (158, 168) of the bottom opening 120 do not overlap when the funnel is in a closed position thereby allowing plant roots to pass through the top opening 110 and the bottom opening 120 of the split funnel as illustrated for example in FIG. 9.

Embodiments of the disclosure can relate to a system that includes a split funnel 100 and a growth environment that is a grow board 200. The grow board 200 can include one or more opening(s) 210 between a top surface 204 and a bottom surface 206 of the grow board 200. The bottom opening 120 of the split funnel in a closed position can overlap an opening 210 of the grow board 200 as illustrated in FIGS. 9-11. A plant 300 can be placed into an opening 210 of the grow board.

Figure 2:
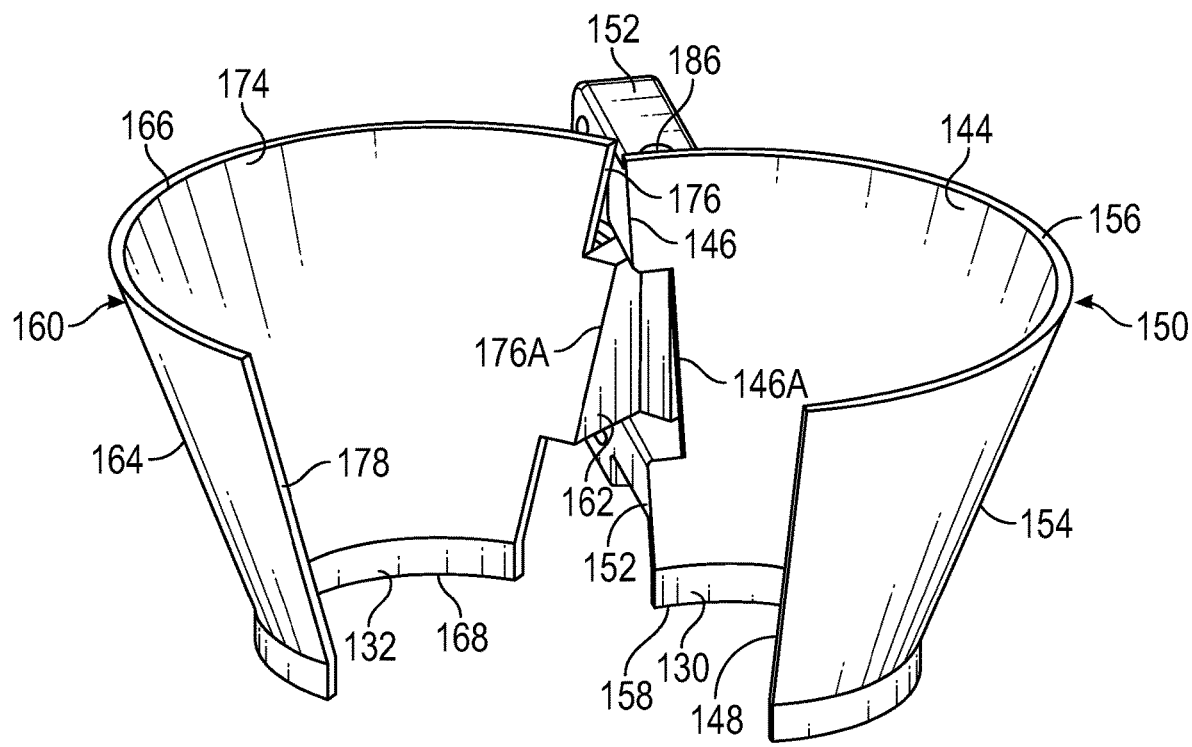
FIG. 2 is an illustration of an embodiment of a split funnel in an opened position.
Figure 3A:
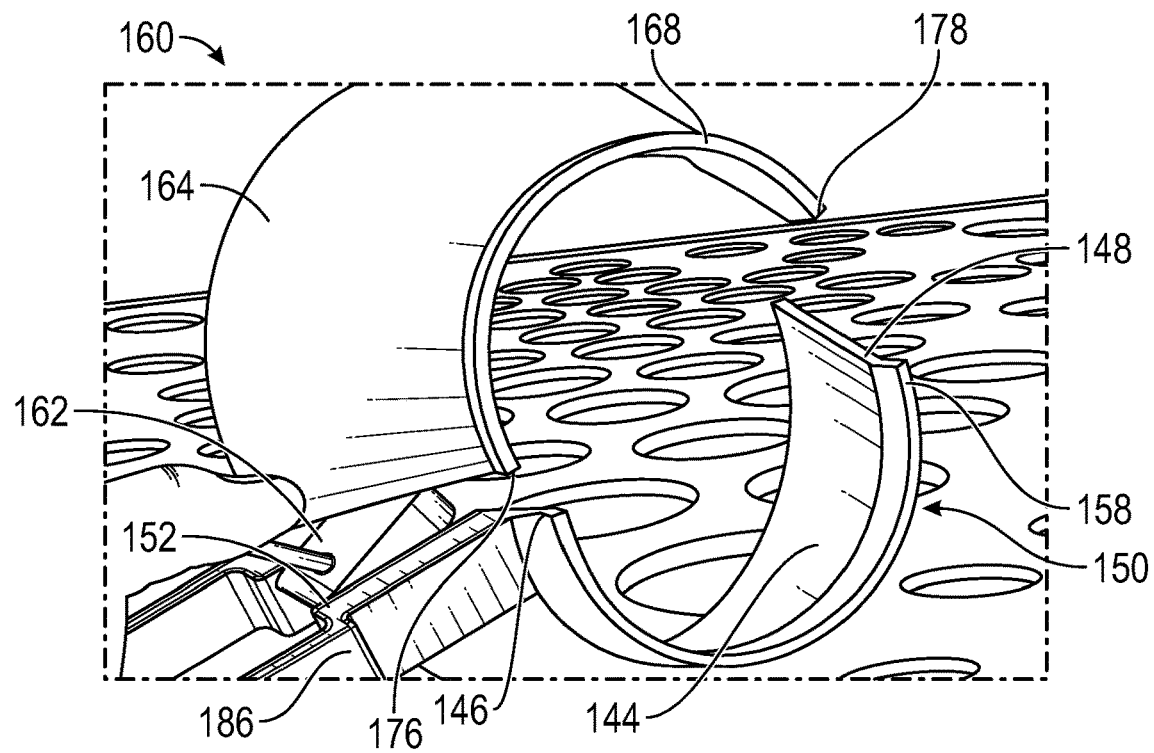
FIGS. 3A-B are illustrations of an embodiment of a split funnel in an open position and a grow board.
Figure 3B:
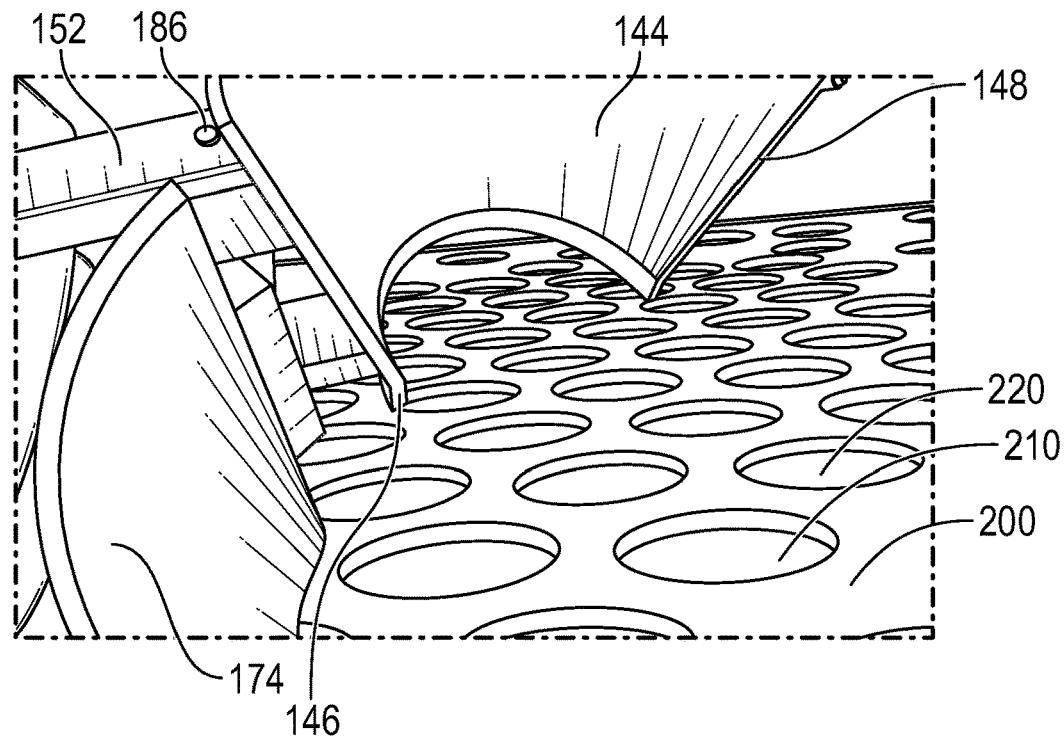

The split funnel 100 can include a first portion 150 and a second portion 160 as illustrated in FIG. 1D, FIG. 2 and FIG. 5B. The first portion 150 can include a first funnel portion 154, and the second portion 160 can include a second funnel portion 164. The first portion 150 and the second portion 160 can be linked to one another such that the funnel portions 154 and 164 can be moved towards or away from each other to join or separate the funnel portions 154, 164. The first portion 150 and the second portion 160 can be hingedly, rotatingly, or pivotingly linked to one another such that the funnel portions 154 and 164 can be moved towards or away from each other to join or separate the funnel portions 154, 164.

The first funnel portion 154 can have a top inner perimeter 156 and a bottom inner perimeter 158. The first funnel portion can have a first side 148 and a second side 146 and can have a wall with an interior surface 144 between the first funnel portion top inner perimeter 156 and the first funnel portion bottom inner perimeter 158. In some embodiments the first portion 150 can include a first portion manipulator 152 which can be joined or made integral with the first funnel portion 154.

The second funnel portion 164 can have a top inner perimeter 166 and a bottom inner perimeter 168. The second funnel portion can have a first side 178 and a second side 176 and can have a wall with an interior surface 174 between the second portion top inner perimeter 166 and the second portion 168 bottom inner perimeter. In some embodiments the second portion 160 can include a second portion manipulator 162 which can be joined or made integral with the second funnel portion 164.

As illustrated in FIG. 1A, the first portion 150 top inner perimeter 156 and the second portion 160 top inner perimeter 166 together form the top opening 110 and the first closed inner perimeter 112 of the split funnel in a closed position. The first portion 150 bottom inner perimeter 158 and the second portion 160 bottom inner perimeter 168 together form the bottom opening 120 and the second closed inner perimeter 122 of the split funnel in the closed position. As illustrated in FIG. 2, the first funnel first side 148 and second funnel first side 178 can form a first separable seam of the split funnel in the closed position. The first funnel second side 146 and second funnel second side 176 can form a second separable seam of the split funnel in the closed position. The funnel sides can be complementary in embodiments of the disclosure. For example, as shown in FIG. 2, the edge 176 can include a protruding portion 176A that can fit into a complementary notch 146A of edge 146. In other embodiments such as illustrated in FIGS. 5A-C the seams can be complementary and substantially straight. Complementary funnel sides can aid in the alignment of the first funnel portion 154 and the second funnel portion 164 and prevent gaps between the bottom edge of the bottom opening and a grow board which can catch and damage roots.

The bottom opening 120 of the split funnel can further include a collar portion 134 in a closed position of the split funnel. The collar portion 134 can include a first collar portion 130 of first funnel portion 154 and a second collar portion 132 of second funnel portion 164. The collar portion can be distal from the top opening 110 and can benefit placement for the split funnel into openings of a new growth environment or grow board.

In embodiments of the disclosure the first portion 150 and the second portion 160 can further include structures that can be combined or joined together to form a bearing structure 180. The bearing structure can link together the first portion 150 and the second portion 160. In some embodiments manipulator portions such as 152 and 162 in FIG. 1D can include structures that can be linked together to form a bearing structure 180. In other embodiments the structures such as 194, optionally 198, and 196 illustrated in FIG. 8A-B can be linked together to form a bearing structure. In still some other embodiments the structures 194, 196, and 198 be linked to form a bearing structure. The structures can be rotatingly, pivotingly, or hingedly linked together using a pin, ball and socket, and the like. The bearing structure 180 can be a hinge and the structure such as 152 and 162 linked together with a pin 186.

In some embodiments of the split funnel as illustrated in FIGS. 1C-D, FIG. 2, and FIGS. 3A-B, the first funnel portion 154 and first portion manipulator portion 152 can be hingedly, rotatingly, or pivotingly linked to the second funnel portion 164 and second portion manipulator portion 162. The manipulator portion 152 and manipulator portion 162 can be joined to form a bearing structure 180 whereby that the funnel portions 154 and 164 can be moved towards or away from each other by the manipulator portions to join or separate the funnel portions 154 and 164.

The first manipulator portion can move with respect to the second manipulator portion about a pin 186 of the bearing structure 180, and the first funnel portion 154 can move with respect to the second funnel portion 164 about the pin 180 between an open position and a closed position of the split funnel. The pin 186 can be positioned in a bore of the bearing structure. Funnel portions such as but not limited to those illustrated by 154 and 164 can have walls with interior wall surfaces 144 and 174. The wall with interior surface 144 can have edges such as 146 and 148 and the wall with interior surface 174 can have edges such as 176 and 178. The edges 148 and 178 and 146 and 176 can be complementary and can be joined together when the split funnel is in a closed position. When moved together the funnel portions 154 and 164 can contact each other to form the closed split funnel 100.

In some embodiments of the split funnel 100, a pivot axis 240 of the bearing structure 180 can be parallel to a longitudinal axis 260 of the split funnel between the top opening 110 and bottom opening 120 as illustrated for example in FIG. 1E. In other embodiments of the split funnel, the pivot axis of the bearing structure can be non-parallel with the longitudinal axis of the split funnel between the top opening 110 and bottom opening 120 as illustrated for example in FIG. 6B. The pivot axis of the bearing structure can be aligned with an axis of a bearing pin 186.

A split funnel with a bearing structure 180 that has a pivot axis 240 parallel to a longitudinal axis 260 of the split funnel can facilitate opening and closing the split funnel with little or no contact between a top surface 204 of a growth environment and bottom surface of the bottom opening 120 and wherein the bottom surface of the bottom opening can remain substantially parallel to a top surface of the growth environment during opening and closing of the split funnel.

Plant roots may be damaged during transplanting because they extend out wider than the hole or opening that they are inserted in. The split funnel in embodiments of the disclosure can enclose and protect the plant roots from damage as they are handled. The split funnel 100 can be used for example to move plants from a first opening or first growth environment into a second opening or second growth environment. The split funnel can be used for example to move plants from a first opening 210 of a grow board 200 into a second opening 220 of the grow board 200. The split funnel can be used to move plants from an opening in a first grow board into an opening of a second grow board. As illustrated in FIG. 6A the split funnel can be placed in the opening 210 of a grow board 200. A plant 300 with roots 340 can optionally be in a net pot 320. As illustrated in FIG. 6B, a plant with roots 340 and optional net pot can be placed between the first funnel portion 154 and the second funnel portion 164 of the split funnel 100. The optional net pot 320 with plant roots 340 can be placed between the first funnel portion 154 and the second funnel portion 164 of the split funnel 100 in a closed position. The plant 300 with the roots 340 and net pot 320 between the first funnel portion and the second funnel portion can be placed into an opening 210 in a grow board 200 as illustrated in FIG. 6C. As illustrated in FIG. 6C the bottom opening 120 of the split funnel can be inside opening 210 of the grow board 200 and plant roots 340 can protrude below the bottom of the grow board 200. The split funnel can be opened to seat the plant and optional net pot in the opening 210 and the split funnel can be removed from the opening 210.

The split funnel 100 can be made from a first portion 150 and second portion 160. The first portion and the second portion can each be assembled or formed by machining monolithic materials, by molding, by 3-D printing, or by fixing separate components such as a manipulator portion, bearing structures, a funnel portion, and combinations or sub-combinations of these together. In one non-limiting embodiment illustrated in FIG. 1D, the first portion 150 and the second portion 160 can each be a single molded piece including a manipulator portion, one or more bearing structure(s), and a funnel portion. In another non-limiting example illustrated in FIGS. 5A-C, the first portion and the second portion can each have bearing structure(s) and funnel portions integrally formed together. In still other embodiments the manipulator portions and bearing structure(s) can be integrally formed together.

Damage to the roots and vegetative systems of a plant can be reduced or eliminated by the split funnel and use thereof in embodiments of the disclosure. The split funnel and methods of using of using it protect and guide the roots of plants being moved from one grow environment into another grow environment. The device is reusable and can be adapted to automated or robotic use.

The split funnel 100 in embodiments of the disclosure can be divided into two portions in the longitudinal direction. The seams where the two portions meet along these edges can run from the top opening of the funnel to the bottom opening of the funnel. The seams can be longitudinal seams where the edges are straight from top to bottom. The seams can be longitudinal seams where the edges are complementary from top to bottom. The two funnel portions 154 and 164 can each be made as a single piece and can be provided with respective manipulator portions 152 and 162. In the closed state of the split funnel 100 shown in FIG. 1D, the two manipulator portions 152 and 162 can form a handling portion 170 when the two manipulator portions 152 and 162 are proximate to one another in a closed split funnel 100.

Away from the interior surfaces of the closed split funnel 100, the two funnel parts 154 and 164 and their corresponding manipulator portions 152 and 162 can be connected to one another by a structure 180 which can be a hinge. The funnel portions 154 and 164 and their respective edges 146 and 148 and 176 and 178 can be moved toward each other and away from each other in a hinge like manner.

To open the split funnel, the two shell parts 154 and 164 and their respective edges 146 and 148 and 176 and 178 can be moved away from each other by actuating the manipulator portions 152 and 162 in a first direction. Conversely, to close the split funnel from an open position, the two shell parts 154 and 164 and their respective edges 146 and 148 and 176 and 178 can be moved towards each other by actuating the manipulator portions 152 and 162 in a second direction.

Figure 7A:
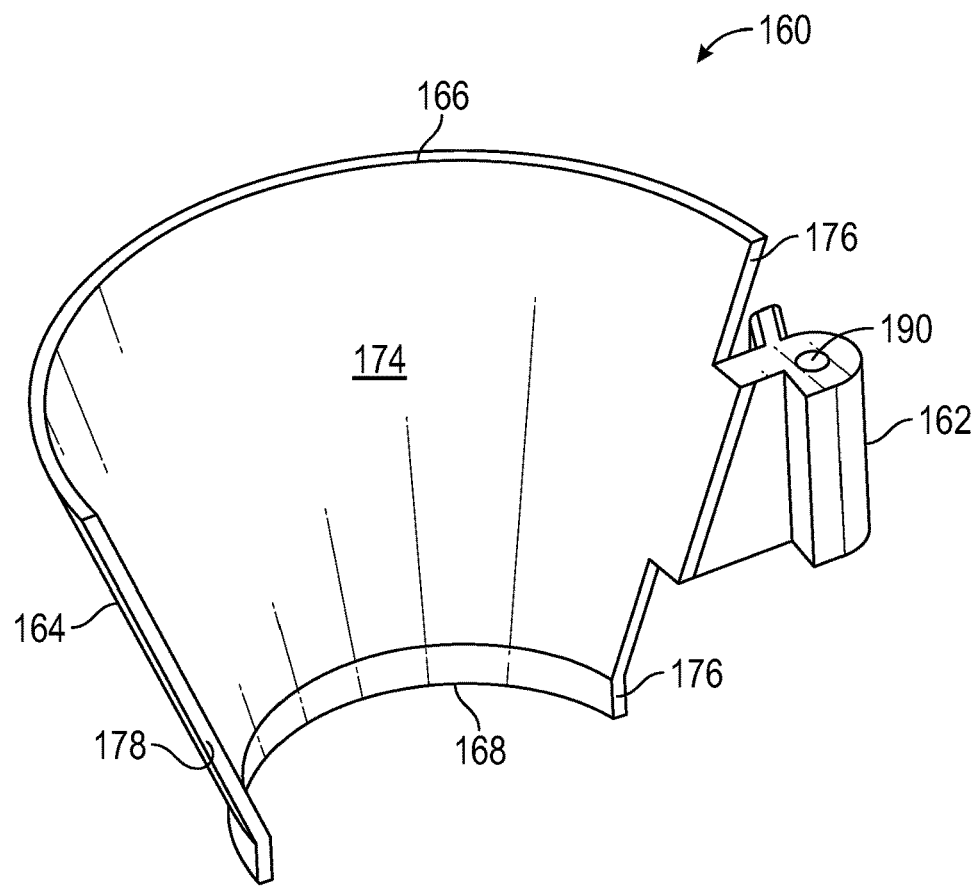
FIGS. 7A-B illustrate isometric views of a second portion (A) and a first portion (B) of a split funnel.
Figure 7B:
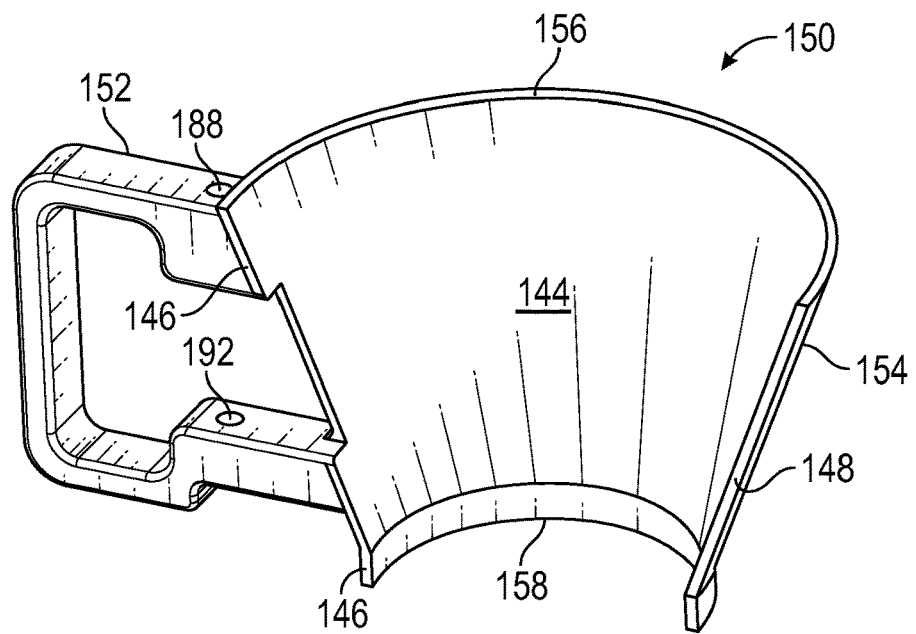
Figure 8A:
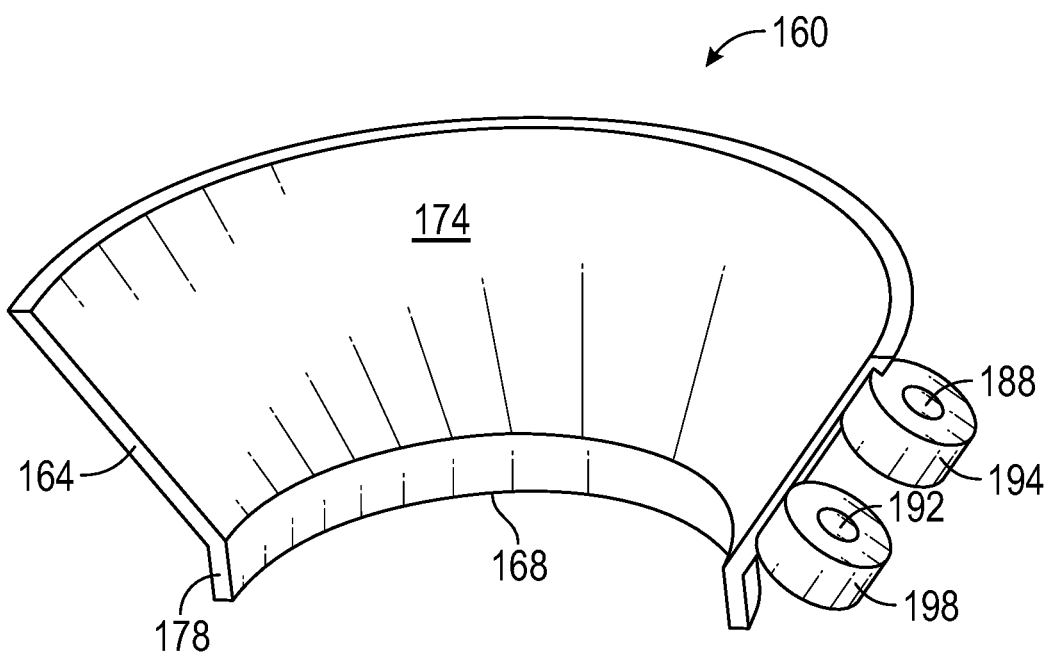
FIGS. 8A-B illustrate isometric views of a second portion (A) and a first portion (B) of a split funnel.
Figure 8B:
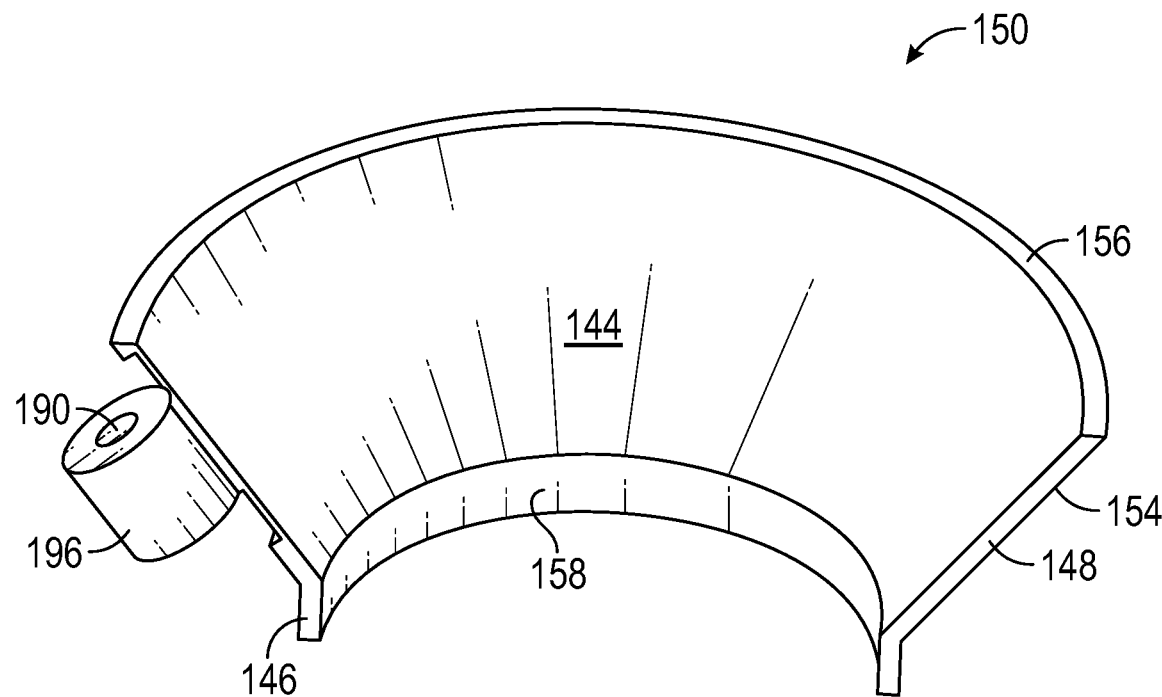

The hinge structure 180 can include bores such as 188, 190, and 192 which are arranged in respective structures or knuckles such as 152 and 162 in FIG. 7A-B or 194, 196, and 198 in FIG. 8A-B. The structures or knuckles 152 and 162 can be made in one piece with their respective funnel parts 152 and 162. The funnel parts 152 and 162 and their respective manipulator portions can be connected to one another by a pin 186. As illustrated in FIG. 7A and FIG. 7B, a surface of the structures or knuckles 152 and 162 can be continuous with a part of the interior surface 174 and 144 of the funnel parts 154 and 164 respectively. As illustrated in FIG. 8A and FIG. 8B, a surface of the structures or knuckles 194, 196, and 198 can be continuous with a part of the interior surface 174 and 144 of the funnel parts 154 and 164 respectively.

The following clauses define particular aspects and embodiments of the disclosure.

Clause 1. A split funnel 100 comprising:

a top opening 110 that has a first closed inner perimeter 112; a bottom opening 120 distal from the top opening, the bottom opening has a second closed inner perimeter 122, the second closed inner perimeter less than the first closed inner perimeter;

the split funnel 100 further comprises a first portion 150 and a second portion 160; the first portion comprises a first funnel portion 154, the first funnel portion 154 has a top inner perimeter 156 and a bottom inner perimeter 158, the first funnel portion has a first side 148 and a second side 146, and a wall with an interior surface 144 between the first portion top inner perimeter 156 and the first portion bottom inner perimeter 158; the second portion 160 comprises a second funnel portion 164, the second funnel portion has a second portion top inner perimeter 166 and a bottom inner perimeter 168, the second funnel portion has a first side 178 and a second side 176, and a wall with an interior surface 174 between the second portion top inner perimeter 166 and the second portion bottom inner perimeter 168;

the first portion top inner perimeter 156 and the second portion top inner perimeter 166 comprise the top opening 110 and the first closed inner perimeter 112 of the split funnel 100 in a closed position; the first portion bottom inner perimeter 158 and the second portion bottom inner perimeter 168 comprise the bottom opening 120 and the second inner perimeter 122 of the split funnel in the closed position;

the first funnel first side 148 and second funnel first side 178 comprise a first seam of the split funnel in the closed position, and the first funnel second side 146 and second funnel second side 176 comprise a second seam of the split funnel in the closed position; and, the first portion and the second portion linked together by a bearing structure.

Clause 2. The split funnel as in clause 1 wherein an axis of the bearing structure is parallel to the longitudinal axis of the funnel.

Clause 3. The split funnel as in any one of clauses 1 or 2, wherein the first portion, the second portion, or both the first portion and the second portion further comprise a manipulator portion and said manipulator(s) are linked to the bearing structure.

Clause 5. The split funnel as in any one of clauses 1-3 wherein the bearing structure is a hinge.

Clause 6. The split funnel as in any one of clauses 1-5 wherein said bottom opening 120 of the split funnel further comprise a collar portion 134.

Clause 7. The split funnel as in any one of clauses 1-6 comprising seams, the first funnel sides are complementary to the second funnel sides.

Clause 8. A system comprising: the split funnel as in any one of clauses 1-7 and a grow board 200 comprising opening(s) 210 between a top surface 204 and a bottom surface 206 of the grow board 200, the bottom opening 120 of the split funnel in a closed position overlaps the opening 210 of the grow board 200.

Clause 9. A split funnel 100 comprising:

a top opening 110 that has a first closed inner perimeter 112; a bottom opening 120 distal from the top opening, the bottom opening has a second closed inner perimeter 122, the second closed inner perimeter less than the first closed inner perimeter;

the split funnel 100 further comprises a first portion 150 and a second portion 160; the first portion 150 comprises a first portion manipulator 152 and a first funnel portion 154, the first funnel portion 154 has a top inner perimeter 156 and a bottom inner perimeter 158, the first funnel portion has a first side 148 and a second side 146 and a wall with an interior surface 144 between the first portion top inner perimeter 156 and the first portion bottom inner perimeter 158; the second portion 160 comprises a second portion manipulator 162 and a second funnel portion 164, the second funnel portion has a top inner perimeter 166 and a bottom inner perimeter 168, the second funnel portion has a first side 178 and a second side 176, and a wall with an interior surface 174 between the second portion top inner perimeter 166 and the second portion bottom inner perimeter 168;

the first portion top inner perimeter 156 and the second portion top inner perimeter 166 comprising the top opening 110 and the first closed inner perimeter 112 of the split funnel 100 in a closed position; the first portion bottom inner perimeter 158 and the second portion bottom inner perimeter 168 comprising the bottom opening 120 and the second inner perimeter 122 of the split funnel 100 in the closed position;

the first funnel first side 148 and second funnel first side 178 comprise a first seam that runs from the top opening 110 to the bottom opening 120 of the split funnel in the closed position, and the first funnel second side 146 and second funnel second side 176 comprise a second seam that runs from the top opening 110 to the bottom opening 120 of the split funnel in the closed position; and, a hinge portion, the hinge portion couples the first portion 150 to the second portion 160 by a pin 180 in a first bore of the first portion manipulator and at a second bore of the second portion manipulator, the first portion manipulator portion moving with respect to the second portion manipulator about the pin 180 and the first funnel portion 154 moving with respect to the second funnel portion 164 about the pin 180 between an open position and a closed position forming the split funnel.

Clause 10. A method comprising:

positioning the bottom opening of a split funnel as in any one of clauses 1-9 to overlap a plant opening in a new growth environment; and placing a plant with roots into the top opening of the split funnel in a closed position, said roots guided into the bottom opening of the split funnel;

Clause 11. The method of claim 10 further comprising:

moving the two funnel portions away from each other; and, transferring the plant with roots from the funnel into the plant opening in the new growth environment.

Clause 12. The method as in any one of clauses 10-11 further comprising:

moving the split funnel to overlap the bottom opening of the split funnel with another plant opening in the new growth environment.

Clause 13. The method as in any one of clauses 10-12 wherein the new growth environment is a grow board.

Clause 14. The method as in any one of clauses 10-13 wherein the bottom opening of the split funnel is positioned within the opening of the new growth environment.

Clause 15. The method as in any one of clauses 10-13 wherein the bottom opening of the split funnel is above a top surface of the new growth environment.

Clause 16. The method of as in any one of clauses 10-15 wherein the plant with roots is in a net pot.

In the description, it is understood that terms such as "top," "bottom," "outward," "inward," and the like are words of convenience and are not to be construed as limiting terms. Reference can be made to embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is said to comprise or consist of at least one element of a group and combinations thereof, it is understood that the embodiment may comprise or consist of any of the elements of the group, either individually or in combination with any of the other elements of that group.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A split funnel, comprising:
a top opening that has a first closed inner perimeter;
a bottom opening distal from the top opening, the bottom opening has a second closed inner perimeter, the second closed inner perimeter smaller than the first closed inner perimeter;
the split funnel further comprises a first portion and a second portion;
the first portion comprises a first funnel portion, the first funnel portion has a top inner perimeter and a bottom inner perimeter, the first funnel portion has a first side and a second side and a wall with an interior surface between the first portion top inner perimeter and the first portion bottom inner perimeter; the second portion comprises a second funnel portion, the second funnel portion has a top inner perimeter and a bottom inner perimeter, the second funnel portion has a first side and a second side and a wall with an interior surface between the second portion top inner perimeter and the second portion bottom inner perimeter;
the first portion top inner perimeter and the second portion top inner perimeter comprise the top opening and the first closed inner perimeter of the split funnel in a closed position;
the first portion bottom inner perimeter and the second portion bottom inner perimeter comprise the bottom opening and the second inner perimeter of the split funnel in the closed position;
the first funnel first side and second funnel first side comprise a first seam of the split funnel in the closed position, and the first funnel second side and second funnel second side comprise a second seam of the split funnel in the closed position; and
the first portion linked to the second portion linked by a bearing structure,
wherein an axis of the bearing structure is parallel to a central longitudinal axis of the split funnel in the closed position.

2. The split funnel as in claim 1, wherein the first portion, the second portion, or both the first portion and the second portion further comprise a manipulator portion.

3. The split funnel as in claim 2, wherein said manipulator portion is linked to the bearing structure.

4. The split funnel as in claim 1, wherein the bearing structure is a hinge.

5. The split funnel as in claim 1, wherein said bottom opening of the split funnel further comprises a collar portion.

6. The split funnel as in claim 1, wherein the first funnel sides are complementary to the second funnel sides.

7. A system, comprising: the split funnel as in claim 1 and a grow board comprising one or more openings between a top surface and a bottom surface of the grow board, the bottom opening of the split funnel in a closed position overlaps the opening of the grow board.

8. A split funnel comprising:
a top opening that has a first closed inner perimeter; a bottom opening distal from the top opening, the bottom opening has a second closed inner perimeter, the second closed inner perimeter less than the first closed inner perimeter;
the split funnel further comprises a first portion and a second portion; the first portion comprises a first portion manipulator and a first funnel portion, the first funnel portion has a top inner perimeter and a bottom inner perimeter, the first funnel portion has a first side and a second side and a wall with an interior surface between the first portion top inner perimeter and the first portion bottom inner perimeter; the second portion comprises a second portion manipulator and a second funnel portion, the second funnel portion has a top inner perimeter and a bottom inner perimeter, the second funnel portion has a first side and a second side, and a wall with an interior surface between the second portion top inner perimeter and the second portion bottom inner perimeter;
the first portion top inner perimeter and the second portion top inner perimeter comprising the top opening and the first closed inner perimeter of the split funnel in a closed position; the first portion bottom inner perimeter and the second portion bottom inner perimeter comprising the bottom opening and the second inner perimeter of the split funnel in the closed position;
the first funnel first side and second funnel first side comprise a first seam that runs from the top opening to the bottom opening of the split funnel in the closed position, and the first funnel second side and second funnel second side comprise a second seam that runs from the top opening to the bottom opening of the split funnel in the closed position; and a hinge portion, the hinge portion couples the first portion to the second portion by a pin in a first bore of the first portion manipulator and at a second bore of the second portion manipulator, the first portion manipulator portion moving with respect to the second portion manipulator about the pin and the first funnel portion moving with respect to the second funnel portion about the pin between an open position and a closed position forming the split funnel, wherein an axis of the hinge portion is parallel to a central longitudinal axis of the split funnel in the closed position.

9. A method, comprising:

positioning the bottom opening of a split funnel of claim 1 to overlap a plant opening in a new growth environment; and placing a plant with roots into the top opening of the split funnel in a closed position, said roots guided into the bottom opening of the split funnel.

10. The method of claim 9, further comprising:

moving the two funnel portions away from each other; and, transferring the plant with roots from the split funnel into the opening in the new growth environment.

11. The method of claim 10, further comprising:

moving the split funnel to overlap the bottom opening of the split funnel with another plant opening in the new growth environment.

12. The method of claim 11, wherein the new growth environment is a grow board.

13. The method of claim 9, wherein the bottom opening of the split funnel is within the opening of the new growth environment.

14. The method of claim 9, wherein the bottom opening of the split funnel is above a top surface of the new growth environment.

15. The method of claim 9, wherein the plant with roots is in a net pot.

\* \* \* \* \*

UNITED STATES PATENT AND TRADEMARK OFFICE
CERTIFICATE OF CORRECTION

| | |
|---|---|
| PATENT NO. | : 11,596,110 B1 |
| APPLICATION NO. | : 17/193656 |
| DATED | : March 7, 2023 |
| INVENTOR(S) | : Helio Marcus Ribeiro et al. |

It is certified that error appears in the above-identified patent and that said Letters Patent is hereby corrected as shown below:

On the Title Page

After "(22) Filed: Mar 5, 2021", please insert the following:
-- Related U.S. Application Data
(60) Provisional application No. 62/987,164, filed on Mar. 9, 2020 --

Signed and Sealed this
Twenty-fifth Day of April, 2023

Katherine Kelly Vidal
*Director of the United States Patent and Trademark Office*